United States Patent
Becker et al.

[11] Patent Number: 6,109,983
[45] Date of Patent: Aug. 29, 2000

[54] BAR FOR AN ELECTRICITY DISTRIBUTION DUCT

[75] Inventors: Franck Becker, Genlis; Gérard Jego, Brazey-en-Plaine; Jean-Pierre Thierry, Arc-sur-Tille, all of France

[73] Assignee: Schneider Electric SA, Boulogne-Billancourt, France

[21] Appl. No.: 09/220,057

[22] Filed: Dec. 23, 1998

[30]   Foreign Application Priority Data

Dec. 24, 1997  [FR]  France ..................................... 97 16822

[51] Int. Cl.⁷ ............................. H01R 9/24; H01R 13/02
[52] U.S. Cl. ...................... 439/886; 439/887; 174/68.2; 174/99 B
[58] Field of Search ..................................... 439/884, 886, 439/887, 889, 212, 207; 174/68.2, 72 B, 99 B, 149 B

[56]   References Cited

U.S. PATENT DOCUMENTS

| | | | |
|---|---|---|---|
| 3,584,137 | 6/1971 | Weimer | 174/68.3 |
| 3,968,500 | 7/1976 | Meisel et al. | 346/139 C |
| 5,466,889 | 11/1995 | Faulkner et al. | 174/68.2 |
| 6,000,977 | 12/1999 | Haake | 439/887 |

FOREIGN PATENT DOCUMENTS 2 484 724   12/1981   France .

*Primary Examiner*—Brian Sircus
*Assistant Examiner*—Michael C. Zarroli
*Attorney, Agent, or Firm*—Oblon, Spivak, McClelland, Maier & Neustadt, P.C.

[57]   ABSTRACT

Bar composed of an aluminum section with which copper contact jumpers are brought into intimate contact at the end or at regular intervals.

The flanges of jumpers 20 have silver plated areas A on their internal surface, for example in the form of strips 24 transverse to the length of the bar and silver plated areas B on their external surface located between the areas A and the web of the jumper. The internal silver plated areas contribute to welding the jumper to the section and the external areas are used for making contact with junction devices or fish plates.

7 Claims, 2 Drawing Sheets

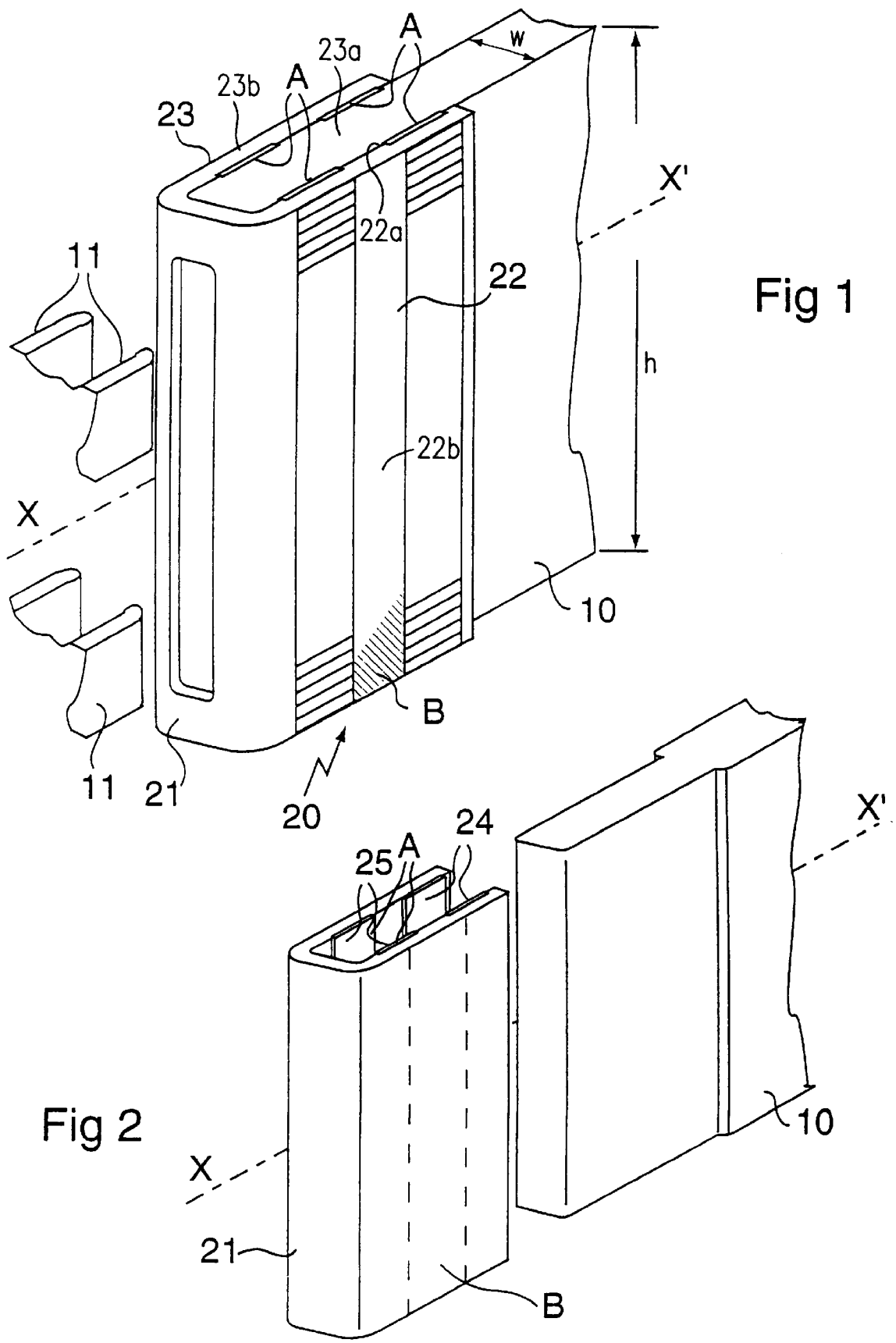

BAR FOR AN ELECTRICITY DISTRIBUTION DUCT

CROSS REFERENCE TO RELATED APPLICATIONS

The present application claims priority under 35 U.S.C. §119 to French Patent Application No. 97 16822, filed Dec. 24, 1997, entitled "Bar For An Electricity Distribution Duct."

BACKGROUND OF THE INVENTION

1. Field of the Invention

This invention relates to a bar for an electricity distribution duct, this bar comprising firstly a flat aluminum section that extends along a longitudinal direction, and secondly copper contact parts put in intimate electrical contact with the section at regular intervals along the length of the section and/or at its ends, the contact parts being U-shaped jumpers, the flanges of which surround the edge of the bar to carry electrical current between the bar and junction devices or fish plates.

2. Description of the Background

A bar of this type is described in patent FR-2 484 724. The copper jumpers thus added onto the aluminum bar give good contact between junction devices or fish plates and the aluminum section; although an aluminum section carries current satisfactorily at a low cost, its conducting quality at locations at which power is transferred to junction cables or bars is not satisfactory unless jumpers are provided, and it is not sufficient to provide continuity with another bar extending it.

Note that if a bar of this type is to operate reliably, it requires good assembly quality between the jumpers and the section, and good contact between the jumpers and the junction device or the fish plates.

SUMMARY OF THE INVENTION

The purpose of this invention is to improve the quality of bars made in this way by the use of very simple measures related to jumpers.

According to the invention, the internal and external surfaces of the flanges of the jumpers each include silver plate area; the silver plated part of the internal surface of a flange provides metal that welds the jumper to the section, and the silver plated area on its external surface provides a contact for junction devices or fish plates.

For example, the silver plated area on the internal surface of the flange may extend along a strip approximately equal to the width of the flange transverse to the longitudinal direction of the bar, the internal silver plated strip being located close to the free end of the flange and the silver plated area of the external surface being located along the longitudinal direction between the strip and the web of the jumper.

There are preferably two internal silver plated strips, one close to the free end of the flange and the other close to the web of the copper contact jumper, the silver plated area of the external surface being located along the longitudinal direction between the two strips, and with a thickness significantly less than the thickness of the internal strips.

The jumper is easily welded to the section by passing a roller along the outside surface of a strip in line with the internal silver plated strip, or by spot welds in line with this strip.

BRIEF DESCRIPTION OF THE DRAWINGS

The following description applies to a non-restrictive embodiment of the invention, with reference to the attached drawings.

FIG. 1 shows a perspective view of one of the ends of a bar according to the invention.

FIG. 2 is a similar perspective view of the jumper before insertion onto the end of the section.

DETAILED DESCRIPTION OF THE PREFERRED EMBODIMENTS

Figure 3:
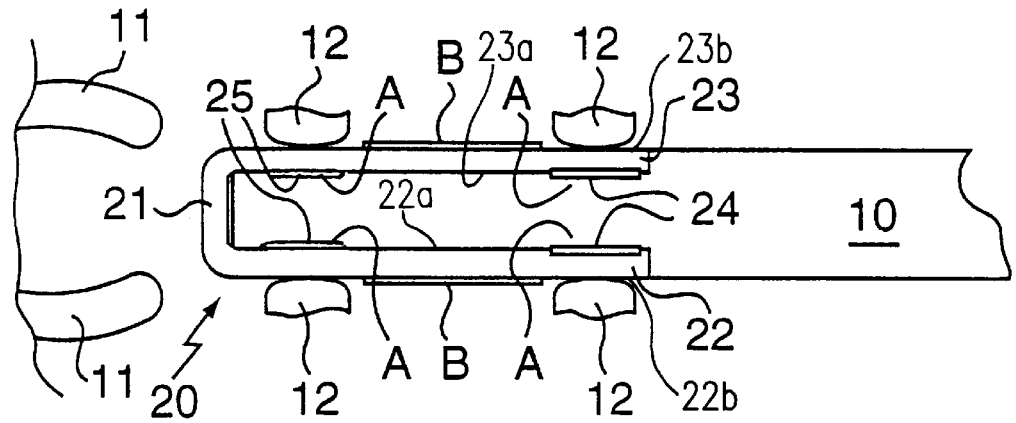
FIG. 3 is a side view of the end of the bar.

The bar shown in the figures is designed to be placed in a prefabricated electrical power distribution duct. The bar comprises an aluminum section 10 that extends along a longitudinal direction X–X', this section being flat, in other words its width w is much greater than its height h. Copper jumpers 20 are placed on it at its ends and at intervals along the length of the section, to make satisfactory electrical contact with connection parts 11 specific to junction devices or fish plates.

Each jumper 20 is a U-shaped part with a web 21 and two flanges 22, 23, the web 21 covering an external or side edge of the section 10, and the flanges being in contact with the flat surfaces of the section. The inside surfaces 22a, 23a and the outside surfaces 22b, 23b of the flanges 22, 23 of jumper 20 are coated with silver over internal area A and external area B respectively.

Preferably, and considering the example of flange 22, the silver plated area A of its internal surface 22a is composed of two strips 24, 25 which extend over the width of the flange transverse to direction X–X', one 24 of the strips being located close to the free end of the flange and the other 25 being located close to the web 21 of the U; the silver plated external area B is located along the section between the two strips 24, 25 (see FIG. 3). If there is only one strip 24 on each flange, this strip is located close to the free end of the flange and the external area B is located along the section between the strip 24 and the web 21 that forms the fold of the U (see FIG. 4). The silver on the external area B improves contact with junction devices or fish plates, whereas the silver on the internal area A provides weld metal for welding the jumper flange to the section. The thickness of the silver plating on the internal area A may typically be of the order of 10 µm, and the thickness of the silver plating on the external area B is significantly less, for example of the order of 3 µm.

Figure 4:
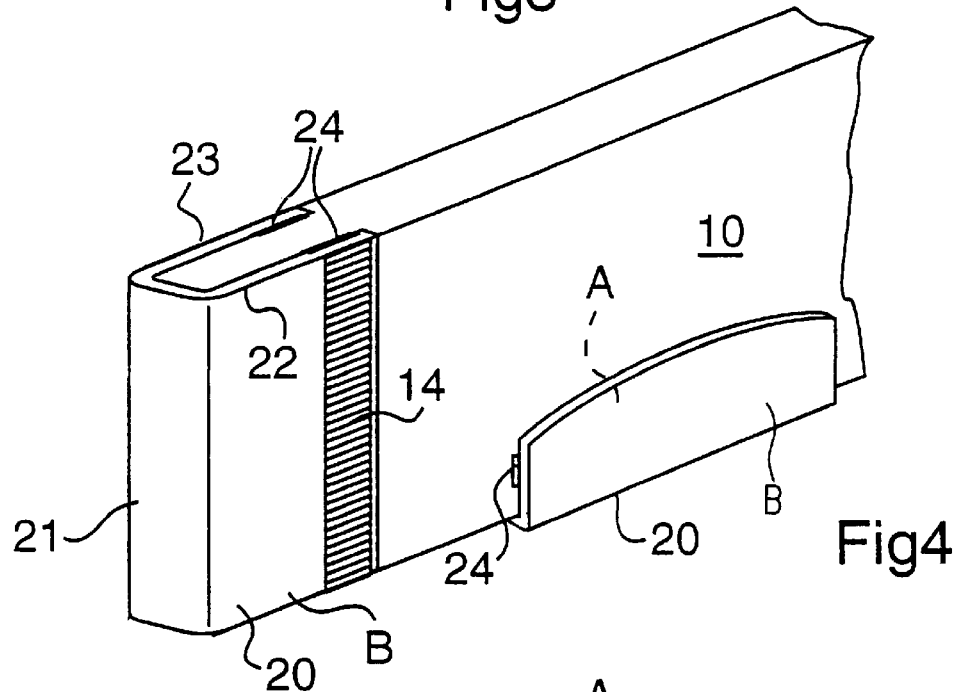
FIGS. 4 and 5 are perspective views of alternative embodiments of the invention.
Figure 5:
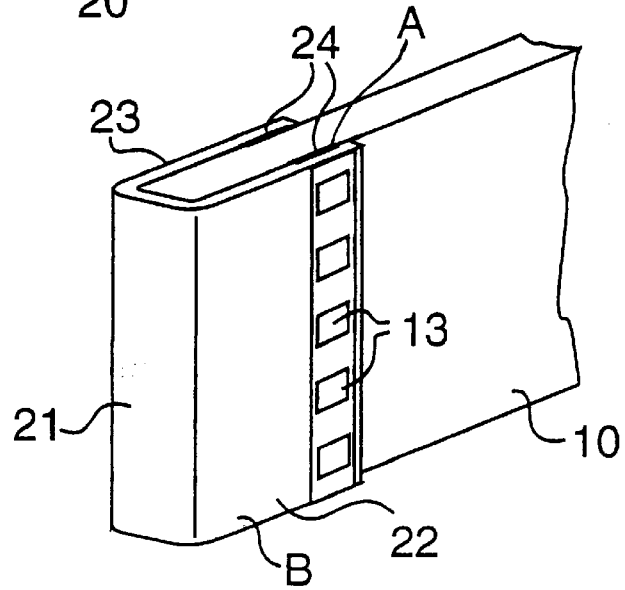

The jumper may be welded to the section by the use of rollers 12 transverse to the bar along a strip 14 parallel to strip 24, or two strips 24, 25 on each flange (FIGS. 1 to 3 or 4), or by spot welds 13 distributed along this strip (see FIG. 5). The jumper may project above the large surfaces of the section 10 (FIGS. 1 and 5) or it may be flush with them (FIGS. 2 to 4).

What is claimed is:

1. A bar for an electricity distribution duct, comprising;
   a flat aluminum section that extends along a longitudinal direction; and
   a plurality of copper contact parts put in intimate electrical contact with the flat aluminum section at regular intervals along at least one of the flat aluminum section and at plural ends of the flat aluminum section, the plurality of copper contact parts being U-shaped jumpers, each of which includes a web and plural flanges configured to surround an edge of the bar to make electrical contact with junction devices or fish plates, the plural flanges each having internal and external surfaces which have a silver plated area respectively, the silver plated area of the internal surface being configured to receive metal that welds a respective one of the U-shaped jumpers to the flat aluminum section and the silver plated area of the external surface being configured to make contact with the junction devices or the fish plates.

2. A bar for an electricity distribution duct according to claim 1, wherein the silver plated area of the internal surface extends along a strip approximately equal to a width of a respective flange of the plural flanges.

3. A bar for an electricity distribution duct accordions to claim 2, wherein the silver plated internal strip is located close to a free end of the respective flange and that the silver plated area of the external surface extends perpendicular to the longitudinal direction between the silver plated internal strip and the web of a respective one of the plurality of copper contact parts.

4. A bar for an electricity distribution duct according to claim 2, wherein the strip comprises two internal silver plated strips one close to a free end of the respective flange and the other close to the web of a respective one of the plurality of copper contact parts, the silver plated area of the external surface extending perpendicular to the longitudinal direction between the two internal silver plated strips.

5. A bar for an electricity distribution duct according to claim 2, wherein each of the U-shaped jumpers and the flat aluminum section are welded by passing a roller over the external surface along a strip in line with respective of the silver plated internal strip.

6. A bar for an electricity distribution duct according to claim 2, wherein each of the U-shaped jumpers and the flat aluminum section are welded at spot welds in line with respective of the silver plated strip.

7. A bar for an electricity distribution duct according to claim 1, wherein the silver plated area of the internal surface has a thickness significantly greater than that of the silver plated area of the external surface.

* * * * *